United States Patent
Hayashi et al.

(10) Patent No.: US 12,415,744 B2
(45) Date of Patent: Sep. 16, 2025

(54) METHOD FOR PRODUCING GLASS SUBSTRATE

(71) Applicant: NIPPON ELECTRIC GLASS CO., LTD., Otsu (JP)

(72) Inventors: Masahiro Hayashi, Otsu (JP); Mayu Fujii, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 943 days.

(21) Appl. No.: 17/620,139

(22) PCT Filed: May 22, 2020

(86) PCT No.: PCT/JP2020/020374
§ 371 (c)(1),
(2) Date: Dec. 17, 2021

(87) PCT Pub. No.: WO2020/255625
PCT Pub. Date: Dec. 24, 2020

(65) Prior Publication Data
US 2022/0242775 A1 Aug. 4, 2022

(30) Foreign Application Priority Data
Jun. 18, 2019 (JP) .................... 2019-112452

(51) Int. Cl.
*C03C 3/093* (2006.01)
*C03B 17/06* (2006.01)
*C03B 25/12* (2006.01)

(52) U.S. Cl.
CPC ............ *C03C 3/093* (2013.01); *C03B 17/064* (2013.01); *C03B 25/12* (2013.01);
(Continued)

(58) Field of Classification Search
CPC ... C03B 17/064; C03B 25/12; C03C 2201/10; C03C 2201/32; C03C 2201/42;
(Continued)

(56) References Cited

U.S. PATENT DOCUMENTS

2009/0226671 A1 9/2009 Yanase et al.
2009/0226733 A1 9/2009 Kato et al.
(Continued)

FOREIGN PATENT DOCUMENTS

CN 101448753 A 6/2009
CN 101568495 A 10/2009
(Continued)

OTHER PUBLICATIONS

Official Communication issued in corresponding Chinese Patent Application No. 202080029858.4, mailed on Sep. 28, 2023.
(Continued)

*Primary Examiner* — Shuangyi Abu Ali
(74) *Attorney, Agent, or Firm* — Keating & Bennett, LLP

(57) ABSTRACT

Provided is a method for producing a glass substrate that can reduce the dimensional change during heat treatment while avoiding shortening of facilities' service lives. A method for producing a glass substrate includes melting and forming a glass raw material to produce a glass substrate having a strain point of 690 to 750° C., wherein an average cooling rate in a temperature range from (an annealing point plus 150° C.) to (the annealing point minus 200° C.) in a cooling process during the forming is adjusted to 100 to 400° C./min to obtain the glass substrate having a degree of thermal contraction of 15 ppm or less when subjected to a heat treatment at 500° C. for an hour.

4 Claims, 1 Drawing Sheet

(52) U.S. Cl.
CPC ...... *C03C 2201/10* (2013.01); *C03C 2201/32* (2013.01); *C03C 2201/42* (2013.01); *C03C 2201/54* (2013.01); *C03C 2203/52* (2013.01)

(58) Field of Classification Search
CPC . C03C 2201/54; C03C 2203/52; C03C 3/093; C03C 3/083; C03C 3/085; C03C 3/087; C03C 3/091; C03C 3/097
See application file for complete search history.

(56) References Cited

U.S. PATENT DOCUMENTS

| | | |
|---|---|---|
| 2009/0270242 A1 | 10/2009 | Yanase et al. |
| 2011/0177287 A1 | 7/2011 | Kato et al. |
| 2013/0017366 A1 | 1/2013 | Kawaguchi et al. |
| 2014/0137602 A1 | 5/2014 | Tamamura et al. |
| 2016/0052819 A1 | 2/2016 | Kawaguchi et al. |
| 2018/0044223 A1* | 2/2018 | Hayashi .................. C03C 3/097 |
| 2018/0141849 A1 | 5/2018 | Saito et al. |
| 2018/0186684 A1 | 7/2018 | Ichikawa et al. |
| 2020/0325060 A1 | 10/2020 | Sakurabayashi et al. |

FOREIGN PATENT DOCUMENTS

| | | |
|---|---|---|
| CN | 101925546 A | 12/2010 |
| CN | 103121792 A | 5/2013 |
| CN | 103269988 A | 8/2013 |
| CN | 104010981 A | 8/2014 |
| CN | 107406302 A | 11/2017 |
| CN | 107709257 A | 2/2018 |
| JP | 2011-20864 A | 2/2011 |
| JP | 2012-197185 A | 10/2012 |
| JP | 2013-133246 A | 7/2013 |
| JP | 2013-230963 A | 11/2013 |
| JP | 2014-70000 A | 4/2014 |
| JP | 2016-11235 A | 1/2016 |
| JP | 2016-183091 A | 10/2016 |
| TW | 200804221 A | 1/2008 |
| TW | 201641457 A | 12/2016 |
| WO | WO-2013047585 A1 * | 4/2013 ........... C03B 17/064 |
| WO | 2018/232153 A2 | 12/2018 |
| WO | 2019/124271 A1 | 6/2019 |

OTHER PUBLICATIONS

Official Communication issued in corresponding Chinese Patent Application No. 202080029858.4, mailed on Mar. 30, 2023.
Official Communication issued in International Patent Application No. PCT/JP2020/020374, mailed on Aug. 18, 2020.

* cited by examiner

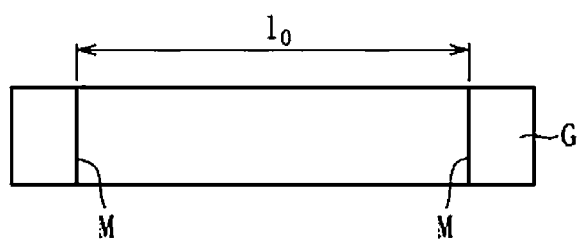
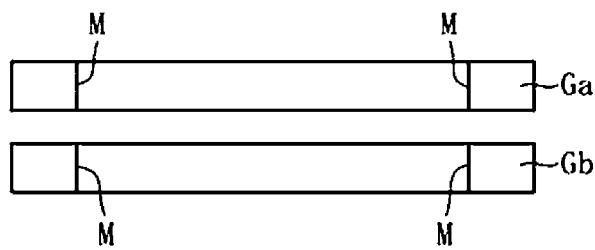
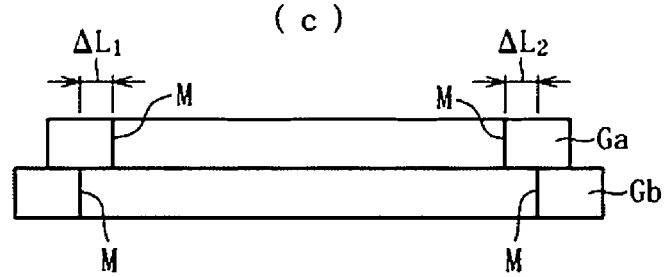

METHOD FOR PRODUCING GLASS SUBSTRATE

TECHNICAL FIELD

The present invention relates to methods for producing glass substrates, specifically relates to a method for producing a glass substrate suitable for an organic EL (OELD) display, a liquid crystal display or the like, and also relates to a method for producing a glass substrate suitable for a display driven by an oxide TFT or a low-temperature p-Si·TFT (LTPS).

BACKGROUND ART

Glass substrates have conventionally been widely used as substrates for flat panel displays, such as liquid crystal displays, hard discs, filters, sensors and so on. In recent years, in addition to conventional liquid crystal displays, OLED displays have been actively developed for reasons of self-emission of light, high color reproducibility, high viewing angle, high-speed response, high definition, and so on and, in some cases, have already been put to practical use.

Meanwhile, a liquid crystal display and an OLED display for use in a mobile device, such as a smartphone are required to display a large amount of information in spite of their small area and therefore need an ultra-high definition screen. In addition, they have to display videos and therefore also need high-speed response.

For the application just described, an OLED display or a liquid crystal display driven by LIPS is suitable. The OLED display emits light when an electric current passes through an OLED element constituting part of each pixel. Therefore, a material having low resistance and high electron mobility is used for a driving TFT element. As the above material, except for the above-mentioned LIPS, an oxide TFT as represented by IGZO (indium-gallium-zinc oxide) has attracted attention. The oxide TFT has low resistance and high electron mobility and can be formed at a relatively low temperature. In addition, the oxide TFT has excellent homogeneity in TFT characteristics in forming elements on a large-area glass substrate. Therefore, the oxide TFT has attracted attention as a leading material for forming TFT and, in some cases, has already been put to practical use.

A glass substrate for use in a high-definition display is required to have many kinds of characteristics. Among them, the following characteristics (1) and (2) are particularly required.

(1) If the content of alkaline component in the glass is much, alkali ions diffuse, during heat treatment, into a semiconductor material formed into a film, which invites degradation in film characteristics. Therefore, the glass substrate is required to have less content of alkaline component (particularly, a Li component and a Na component) or to be substantially free from alkaline component.

(2) In the processes of film formation, dehydrogenation, crystallization of a semiconductor layer, annealing, and so on, the glass substrate is subjected to heat treatment at several hundred degrees C. An example of a problem that may occur during the heat treatment is a pattern mismatch due to thermal contraction and so on of the glass substrate. As the display has a higher definition, the heat treatment temperature becomes higher, but the allowable range of pattern mismatch conversely becomes smaller. Therefore, the glass substrate is required to undergo less dimensional change during the heat treatment. The main causes of dimensional change during the heat treatment are thermal contraction, film stress after the film formation, and so on. Hence, in order to reduce the dimensional change during the heat treatment, the glass substrate is required to have a high strain point.

Furthermore, from the perspective of producing a glass substrate, the glass substrate is required to have the following characteristics (3) to (5):

(3) In order to extend the service life of forming facilities, the forming temperature is required to be low;

(4) In order to prevent melting defects, such as bubbles, devitrified matters, and striae, the glass is required to have excellent meltability; and (5) In order to avoid incorporation of devitrified crystals into the glass substrate, the glass is required to have excellent devitrification resistance.

SUMMARY OF INVENTION

Technical Problem

An example of an approach for reducing the degree of thermal contraction is to design the strain point at a high value as described previously. However, if the strain point is too high, the melting temperature and the forming temperature become high, which is disadvantageous in that the service lives of the melting facilities and forming facilities are shortened.

The present invention has been made in view of the foregoing circumstances and its technical challenge is to provide a method for producing a glass substrate that can reduce the dimensional change during heat treatment while avoiding shortening of facilities' service lives.

Solution to Problem

The inventors have conducted intensive studies, resulting in the finding that by controlling the strain point of the glass substrate and the cooling rate during forming in respective predetermined ranges, the degree of thermal contraction can be reduced to a desired value while the burden on production facilities can be reduced, and propose the finding as the present invention. Specifically, a method for producing a glass substrate according to the present invention is a method for producing a glass substrate, the method including melting and forming a glass raw material to produce a glass substrate having a strain point of 690 to 750° C., wherein an average cooling rate in a temperature range from (an annealing point plus 150° C.) to (the annealing point minus 200° C.) in a cooling process during the forming is adjusted to 100 to 400° C./min to obtain the glass substrate having a degree of thermal contraction of 15 ppm or less when subjected to a heat treatment at 500° C. for an hour. Herein, the "strain point" and the "annealing point" refer to values measured based on the method described in ASTM C336. The "degree of thermal contraction when subjected to a heat treatment at 500° C. for an hour" is measured by the following method. First, as shown in FIG. 1(a), a strip sample G with 160 mm×30 mm is prepared as a measurement sample. On both end portions of the strip sample G in the longitudinal direction, respective markings M are formed at 20 to 40 mm distance from both edges of the strip sample G, using #1000 water-proof abrasive paper. Thereafter, as shown in FIG. 1(b), the strip sample G having the markings M formed thereon is folded and split into two pieces along a direction perpendicular to the markings M, thus making specimens Ga and Gb. Then, only one specimen Gb is subjected to a heat treatment of increasing the temperature from ordinary temperature to 500° C. at a rate of 5° C./min, holding the temperature at 500° C. for an hour, and then decreasing the temperature at a rate of 5° C./min. After the above heat treatment, as shown in FIG. 1(c), the specimen Ga not subjected to the heat treatment and the specimen Gb subjected to the heat treatment are juxtaposed and, in this state, the amounts of misalignment ($\Delta L_1$ and $\Delta L_2$) between the markings M of the two specimens Ga and Gb are read with a laser microscope. Then, the degree of thermal contraction is calculated from the amounts of misalignment based on the equation below. Note that 10 mm in the equation below is an initial distance between the markings M. The "average cooling rate" refers to a rate determined by calculating the time taken for a central portion of the glass in the sheet width direction to pass through an area (annealing area) falling within a temperature range from (the annealing point plus 150° C.) to (the annealing point minus 200° C.) and dividing a temperature difference (=350° C.) in the annealing region by the time taken for the central portion to pass through the annealing area.

$$\text{Degree of thermal contraction (ppm)}=[\{\Delta L_1\ (\mu m)+ \Delta L_2\ (\mu m)\}\times 10^3]/10\ (mm)$$

In the method for producing a glass substrate according to the present invention, the forming is preferably performed by an overflow downdraw method.

The method for producing a glass substrate according to the present invention preferably obtains the glass substrate having a width of 3 m or more.

The method for producing a glass substrate according to the present invention preferably obtains the glass substrate containing, as a glass composition in terms of % by mole, 60 to 75% $SiO_2$, 10 to 15% $Al_2O_3$, 0 to 5% $B_2O_3$, 0 to 0.1% $Li_2O$, 0 to 0.1% $Na_2O$, 0 to 1% $K_2O$, 0 to 8% MgO, 0 to 10% CaO, 0 to 10% SrO, 0 to 10% BaO, 0 to 10% ZnO, 0 to 10% $P_2O_5$, and 0 to 1% $SnO_2$.

In the method for producing a glass substrate according to the present invention, preferably, after the forming into the glass substrate, the glass substrate is split into two or more glass substrates of G6 size (1.5 m×1.8 m).

A method for producing a glass substrate according to the present invention is a method for producing a glass substrate, the method including melting and forming a glass raw material to produce a glass substrate having a strain point of 690 to 750° C. and a degree of thermal contraction of 15 ppm or less when subjected to a heat treatment at 500° C. for an hour, the glass substrate containing, as a glass composition in terms of % by mole, 60 to 75% $SiO_2$, 10 to 15% $Al_2O_3$, 0 to 5% $B_2O_3$, 0 to 0.1% $Li_2O$, 0 to 0.1% $Na_2O$, 0 to 1% $K_2O$, 0 to 8% MgO, 0 to 10% CaO, 0 to 10% SrO, 0 to 10% BaO, 0 to 10% ZnO, 0 to 10% $P_2O_5$, and 0 to 1% $SnO_2$, wherein after the forming into the glass substrate, the glass substrate is split into two or more glass substrates of G6 size (1.5 m×1.8 m).

A method for producing a glass substrate according to the present invention is a method for producing a glass substrate, the method including subjecting a glass raw material to melting and forming by a downdraw method to produce a glass substrate having a strain point of 690 to 750° C. and containing, as a glass composition in terms of % by mole, 60 to 75% $SiO_2$, 10 to 15% $Al_2O_3$, 0 to 5% $B_2O_3$, 0 to 0.1% $Li_2O$, 0 to 0.1% $Na_2O$, 0 to 1% $K_2O$, 0 to 8% MgO, 0 to 10% CaO, 0 to 10% SrO, 0 to 10% BaO, 0 to 10% ZnO, 0 to 10% $P_2O_5$, and 0 to 1% $SnO_2$, wherein an average cooling rate in a temperature range from (an annealing point plus 150° C.) to (the annealing point minus 200° C.) in a cooling process during the forming is adjusted to 100 to 400° C./min to obtain the glass substrate having a degree of thermal contraction of 15 ppm or less when subjected to a heat treatment at 500° C. for an hour and having a width of 3 m or more, and the glass substrate is then split in a width direction into two or more glass substrates of G6 size (1.5 m×1.8 m).

A glass substrate according to the present invention has a strain point of 690 to 750° C. and a degree of thermal contraction of 15 ppm or less when subjected to a heat treatment at 500° C. for an hour, and contains, as a glass composition in terms of % by mole, 60 to 75% $SiO_2$, 10 to 15% $Al_2O_3$, 0 to 5% $B_2O_3$, 0 to 0.1% $Li_2O$, 0 to 0.1% $Na_2O$, 0 to 1% $K_2O$, 0 to 8% MgO, 0 to 10% CaO, 0 to 10% SrO, 0 to 10% BaO, 0 to 10% ZnO, 0 to 10% $P_2O_5$, and 0 to 1% $SnO_2$.

Advantageous Effects of Invention

The present invention enables provision of a method for producing a glass substrate that can reduce the dimensional change during heat treatment while avoiding shortening of facilities' service lives.

BRIEF DESCRIPTION OF DRAWINGS

FIG. 1 is a view for illustrating a method for measuring the degree of thermal contraction.

DESCRIPTION OF EMBODIMENTS

The degree of thermal contraction of a glass substrate depends mainly on the strain point of the glass substrate and the cooling rate during forming into the glass substrate. In view of this, in the present invention, the strain point of a glass substrate is adjusted to 690 to 750° C. and the average cooling rate in a temperature range from (the annealing point plus 150° C.) to (the annealing point minus 200° C.) in a cooling process during the forming is adjusted to 100 to 400° C./min, whereby it becomes possible to obtain a glass substrate having a degree of thermal contraction of 15 ppm or less when subjected to a heat treatment at 500° C. for an hour.

First, a description will be given of the characteristics and composition of the glass substrate.

The degree of thermal contraction of the glass substrate when subjected to a heat treatment at 500° C. for an hour is 15 ppm or less, preferably 14.5 ppm or less, more preferably 14 ppm or less, still more preferably 13.5 ppm or less, yet still more preferably 13 ppm or less, even more preferably 12.5 ppm or less, and particularly preferably 12 ppm or less. Thus, even when subjected to a heat treatment during a process for producing LTPS, the glass substrate is less likely to cause defects, such as pattern mismatch. However, if the degree of thermal contraction is too low, the production efficiency of the glass substrate is likely to decrease. Therefore, the degree of thermal contraction is preferably not less than 1 ppm, more preferably not less than 2 ppm, still more preferably not less than 3 ppm, yet still more preferably not less than 4 ppm, and particularly preferably not less than 5 ppm.

As the strain point is higher, the degree of thermal contraction can be more lowered. The strain point is not lower than 690° C., preferably not lower than 695° C., more preferably not lower than 700° C., still more preferably not lower than 702° C., yet still more preferably not lower than 704° C., even more preferably not lower than 705° C., even still more preferably not lower than 706° C., even yet still more preferably not lower than 707° C., further preferably not lower than 708° C., further more preferably not lower than 709° C., and particularly preferably not lower than 710° C. On the other hand, if the strain point is too high, the melting temperature and the forming temperature become high, so that the production efficiency of the glass substrate is likely to decrease and the burden on the forming facilities tends to be high. Therefore, the strain point is not higher than 750° C., preferably not higher than 748° C., more preferably not higher than 746° C., still more preferably not higher than 744° C., yet still more preferably not higher than 742° C., even more preferably not higher than 740° C., even still more preferably not higher than 738° C., even yet still more preferably not higher than 736° C., further preferably not higher than 735° C., further more preferably not higher than 734° C., still furthermore preferably not higher than 733° C., yet still further more preferably not higher than 732° C., even yet still further more preferably not higher than 731° C., and particularly preferably not higher than 730° C. The most preferred range of strain points is 710 to 730° C.

As the temperature at $10^{4.5}$ dPa·s is lower, the burden on the forming facilities can be more reduced. The temperature at $10^{4.5}$ dPa·s is preferably not higher than 1300° C., more preferably not higher than 1295° C., still more preferably not higher than 1290° C., yet still more preferably not higher than 1285° C., even more preferably not higher than 1280° C., even still more preferably not higher than 1275° C., and particularly preferably not higher than 1270° C. On the other hand, if the temperature at $10^{4.5}$ dPa·s is too low, the strain point cannot be designed at a high value. Therefore, the temperature at $10^{4.5}$ dPa·s is preferably not lower than 1150° C., more preferably not lower than 1170° C., still more preferably not lower than 1180° C., yet still more preferably not lower than 1185° C., even more preferably not lower than 1190° C., even still more preferably not lower than 1195° C., even yet still more preferably not lower than 1200° C., further preferably not lower than 1205° C., further more preferably not lower than 1210° C., still further more preferably not lower than 1215° C., and particularly preferably not lower than 1220° C.

The glass substrate preferably has, in addition to the above characteristics, the following characteristics.

In forming glass into a sheet by the overflow downdraw method or so on, what is important here is devitrification resistance. Considering the forming temperature of glass containing, as the glass composition, $SiO_2$, $Al_2O_3$, $B_2O_3$, and an alkaline earth metal oxide (RO), the liquidus temperature is preferably 1300° C. or lower, more preferably 1280° C. or lower, still more preferably 1270° C. or lower, yet still more preferably 1250° C. or lower, even more preferably 1240° C. or lower, even still more preferably 1230° C. or lower, even yet still more preferably 1220° C. or lower, further preferably 1210° C. or lower, and particularly preferably 1200° C. or lower. Furthermore, the liquidus viscosity is preferably $10^{4.8}$ dPa·s or higher, more preferably $10^{4.9}$ dPa·s or higher, still more preferably $10^{5.0}$ dPa·s or higher, yet still more preferably $10^{5.1}$ dPa·s or higher, even more preferably $10^{5.2}$ dPa·s or higher, and particularly preferably $10^{5.3}$ dPa·s or higher. Herein, the "liquidus temperature" refers to a temperature at which devitrified crystals (crystalline foreign bodies) have been recognized in a glass obtained by putting a glass powder having passed through a 30 mesh (500 μm) standard sieve and having been retained on a 50 mesh (300 μm) sieve into a platinum boat, holding the platinum boat in a temperature-gradient furnace set at 1100° C. to 1350° C. for 24 hours, and then taking out the platinum boat from the furnace. The "liquidus viscosity" refers to a value obtained by measuring the viscosity of the glass at the liquidus temperature by the platinum ball pulling-up method.

As the Young's modulus is higher, the glass substrate is more difficult to deform. The Young's modulus is preferably not less than 78 GPa, more preferably not less than 78.5 GPa, still more preferably not less than 79 GPa, yet still more preferably not less than 79.5 GPa, even more preferably not less than 80 GPa, even still more preferably not less than 80.5 GPa, even yet still more preferably not less than 81 GPa, further preferably not less than 81.5 GPa, further more preferably not less than 82 GPa, still further more preferably not less than 82.5 GPa, and particularly preferably not less than 83 GPa. On the other hand, a composition having a high Young's modulus tends to deteriorate the chemical resistance. Therefore, the Young's modulus is preferably not more than 120 GPa, more preferably not more than 110 GPa, still more preferably not more than 100 GPa, yet still more preferably not more than 95 GPa, even more preferably not more than 90 GPa, and particularly preferably not more than 88 GPa. The "Young's modulus" refers to a value measured by dynamic elastometry (the resonance method) based on JIS R1602.

A preferred upper limit range of coefficients of thermal expansion is not more than $45 \times 10^{-7}$/° C., more preferably not more than $42 \times 10^{-7}$/° C., still more preferably not more than $41 \times 10^{-7}$/° C., and particularly preferably not more than $40 \times 10^{-7}$/° C., and a preferred lower limit range thereof is not less than $35 \times 10^{-7}$/° C., more preferably not less than $36 \times 10^{-7}$/° C., and particularly preferably not less than $37 \times 10^{-7}$/° C. If the coefficient of thermal expansion is out of the above ranges, the glass substrate is mismatched in coefficient of thermal expansion with various films (for example, a-Si or p-Si), so that defects, such as film detachment and dimensional changes during heat treatment, are likely to occur. The "coefficient of thermal expansion" refers to an average coefficient of thermal expansion measured in a temperature range of 30 to 380° C., and can be measured, for example, by a dilatometer.

The etching depth of the glass substrate when immersed into a 10% by mass HF aqueous solution at room temperature for 30 minutes preferably reaches 20 μm or more, more preferably 22 μm or more, still more preferably 25 μm or more, yet still more preferably 27 μm or more, even more preferably 28 μm or more, even still more preferably 29 to 50 μm, and particularly preferably 30 to 40 μm. If the etching depth is too small, the glass substrate is difficult to thin in a slimming process. The etching depth is an index of the etching rate. Specifically, the larger the etching depth, the faster the etching rate, and the smaller the etching depth, the slower the etching rate.

The β-OH value is preferably 0.50/mm or less, more preferably 0.45/mm or less, still more preferably 0.40/mm or less, yet still more preferably 0.35/mm or less, even more preferably 0.30/mm or less, even still more preferably 0.25/mm or less, even yet still more preferably 0.20/mm or less, further preferably 0.15/mm or less, and particularly preferably 0.10/mm or less. When the β-OH value is lowered, the strain point can be elevated. Examples of the method for lowering the β-OH value include the following methods: (1) selection of a raw material having a low water content; (2) addition of a component (such as Cl or $SO_3$) for reducing the amount of water in the glass; (3) reduction of the amount of water in a furnace atmosphere; (4) $N_2$ bubbling in molten glass; (5) adoption of a small melting furnace; (6) increase of the flow rate of molten glass; and (7) use of electrical melting process. Herein, the "β-OH value"

refers to a value determined by measuring the transmittance of glass with FT-IR and using the following equation.

$$\beta\text{-OH value} = (1/X)\log(T_1/T_2)$$

X: glass thickness (mm)
$T_1$: transmittance (%) at a reference wavelength of 3846 cm$^{-1}$
$T_2$: minimum transmittance (%) at a hydroxyl group absorption wavelength of around 3600 cm$^{-1}$ The glass substrate according to the present invention preferably contains, as a glass composition in terms of % by mole, 60 to 75% $SiO_2$, 10 to 15% $Al_2O_3$, 0 to 5% $B_2O_3$, 0 to 0.1% $Li_2O$, 0 to 0.1% $Na_2O$, 0 to 1% $K_2O$, 0 to 8% MgO, 0 to 10% CaO, 0 to 10% SrO, 0 to 10% BaO, 0 to 10% ZnO, 0 to 10% $P_2O_5$, and 0 to 1% $SnO_2$. The reasons why the respective ranges of contents of the components are limited as above will be described below. In the descriptions of the respective ranges of contents of the components, % represents % by mole.

If the content of $SiO_2$ is too small, the chemical resistance, particularly the acid resistance, is likely to decrease and the strain point is likely to decrease. On the other hand, if the content of $SiO_2$ is too large, the rate of etching by hydrofluoric acid or a solution mixed with hydrofluoric acid is likely to decrease. Furthermore, the high-temperature viscosity becomes high, so that the meltability is likely to decrease. In addition, $SiO_2$-based crystals, particularly cristobalite, precipitates, so that the liquidus viscosity is likely to decrease. Therefore, a preferred upper limit to the content of $SiO_2$ is 75%, more preferably 74%, still more preferably 73%, yet still more preferably 72%, even more preferably 71%, even still more preferably 70%, and particularly preferably 69%, and a preferred lower limit thereto is 60%, more preferably 61%, still more preferably 62%, yet still more preferably 62.5%, even more preferably 63%, even still more preferably 63.5%, even yet still more preferably 64%, further preferably 64.5%, furthermore preferably 65%, still further preferably 65.5%, yet still further more preferably 66%, even yet still further more preferably 66.5%, and particularly preferably 67%. The most preferred range of contents is 67 to 69%.

If the content of $Al_2O_3$ is too small, the strain point decreases to increase the amount of thermal contraction and the Young's modulus decreases to make the glass substrate easily bendable. On the other hand, if the content of $Al_2O_3$ is too large, the resistance to BHF (buffered hydrofluoric acid) decreases, so that the glass surface is likely to be cloudy and the crack resistance is likely to decrease. In addition, $SiO_2$—$Al_2O_3$-based crystals, particularly mullite, precipitates in the glass, so that the liquidus viscosity is likely to decrease. A preferred upper limit to the content of $Al_2O_3$ is 15%, more preferably 14.5%, still more preferably 14%, yet still more preferably 13.5%, and particularly preferably 13%, and a preferred lower limit thereto is 10%, more preferably 10.5%, still more preferably 11%, yet still more preferably 11.5%, and particularly preferably 12%. The most preferred range of contents is 12 to 13%.

$B_2O_3$ is a component that acts as a flux to decrease the viscosity and thus improve the meltability. In addition, $B_2O_3$ is a component that improves the resistance to BHF and the crack resistance and decreases the liquidus temperature. However, if the content of $B_2O_3$ is too large, the strain point, the thermal resistance, and the acid resistance are likely to decrease and the strain point is particularly likely to decrease. In addition, the glass is likely to cause phase separation. A preferred upper limit to the content of $B_2O_3$ is 5%, more preferably 4.5%, and particularly preferably 4%, and a preferred lower limit thereto is 0%, more preferably 1%, still more preferably 1.5%, yet still more preferably 2%, even more preferably 2.5%, even still more preferably 3%, and particularly preferably over 3%. The most preferred range of contents is over 3% to 4%.

$Li_2O$ and $Na_2O$ deteriorate the characteristics of various films and semiconductor devices formed on the glass substrate. Therefore, the content of each of $Li_2O$ and $Na_2O$ is preferably reduced to 0.1% (more preferably 0.06%, still more preferably 0.05%, yet still more preferably 0.02%, and particularly preferably 0.01%). As compared to $Li_2O$ and $Na_2O$, $K_2O$ more mildly deteriorates the characteristics of various films and semiconductor devices formed on the glass substrate. In addition, the incorporation of a small amount of $K_2O$ has the effect of improving the solubility and the effect of eliminating static charges. Therefore, the content of $K_2O$ is preferably reduced to 1% (more preferably 0.50, still more preferably 0.40, and particularly preferably 0.3%).

MgO is a component that decreases the high-temperature viscosity without decreasing the strain point to improve the meltability. Furthermore, MgO has the effect of decreasing the density most significantly among RO (where R represents at least one selected from the group consisting of Mg, Ca, Sr, Ba, and Zn), but excessive incorporation thereof causes precipitation of $SiO_2$-based crystals, particularly cristobalite, so that the liquidus viscosity is likely to decrease. In addition, MgO is a component that reacts with BHF and is thus likely to form a reaction product. This reaction product may fix to devices on the surface of the glass substrate or adhere to the glass substrate to contaminate the devices or the glass substrate. Furthermore, impurities, such as $Fe_2O_3$, in a raw material, such as dolomite, for use in incorporating MgO may be mixed into the glass to decrease the transmittance of the glass substrate. Therefore, a preferred upper limit to the content of MgO is 8%, more preferably 7.5%, still more preferably 7%, yet still more preferably 6.5%, and particularly preferably 6%, and a preferred lower limit thereto is 0%, more preferably 1%, still more preferably 1.5%, yet still more preferably 2%, even more preferably 2.5%, even still more preferably 3%, even yet still more preferably 3.5%, further preferably 4%, and particularly preferably 4.5%. The most preferred range of contents is 4.5 to 6%.

CaO is a component that, like MgO, decreases the high-temperature viscosity without decreasing the strain point to significantly improve the meltability. However, if the content of CaO is too large, $SiO_2$—$Al_2O_3$—RO-based crystals, particularly anorthite, precipitates, so that the liquidus viscosity becomes likely to decrease. In addition, the resistance to BHF decreases, so that a reaction product may fix to devices on the surface of the glass substrate or adhere to the glass substrate to make the devices or the glass substrate cloudy. Therefore, a preferred upper limit to the content of CaO is 10%, more preferably 9.5%, still more preferably 9%, yet still more preferably 8.5%, even more preferably 8%, even still more preferably 7.5%, and particularly preferably 7%, and a preferred lower limit thereto is 0%, more preferably 1%, still more preferably 2%, yet still more preferably 3%, even more preferably 3.5%, even still more preferably 4%, even yet still more preferably 4.5%, and particularly preferably 5%. The most preferred range of contents is 5 to 7%.

SrO is a component that increases the chemical resistance and the devitrification resistance, but an excessively high proportion of SrO in the total content of RO makes it likely that the meltability decreases and that the density and the coefficient of thermal expansion increase. Therefore, the content of SrO is preferably 0 to 10%, more preferably 0 to 9%, still more preferably 0 to 8%, yet still more preferably 0 to 7%, even more preferably 0 to 6%, and particularly preferably 0 to 5%.

BaO is a component that increases the chemical resistance and the devitrification resistance, but an excessively large content thereof makes it likely that the density increases. Furthermore, $SiO_2$—$Al_2O_3$—$B_2O_3$—RO-based glass is generally difficult to melt. Therefore, from the perspective of supplying high-quality glass substrates at low cost and in large amounts, it is very important to increase the meltability and reduce the fraction defective due to bubbles, foreign bodies or so on. However, among RO, BaO is not very effective in increasing the meltability. Therefore, a preferred upper limit to the content of BaO is 10%, more preferably 9%, still more preferably 8%, yet still more preferably 7%, even more preferably 6%, even still more preferably 5%, even yet still more preferably 4.5%, further preferably 4%, and particularly preferably 3.5%, and a preferred lower limit thereto is 0%, more preferably 0.1%, still more preferably 0.2%, yet still more preferably 0.3%, even more preferably 0.4%, and particularly preferably 0.5%.

ZnO is a component that improves the meltability and the resistance to BHF, but an excessively large content thereof makes the glass easily devitrifiable and decreases the strain point, which makes it difficult to maintain the thermal resistance. Therefore, the content of ZnO is preferably 0 to 10%, more preferably 0 to 5%, still more preferably 0 to 3%, yet still more preferably 0 to 2%, and particularly preferably 0 to 1%.

$P_2O_5$ is a component that decreases the liquidus-line temperatures of $SiO_2$—$Al_2O_3$—CaO-based crystals (particularly anorthite) and $SiO_2$—$Al_2O_3$-based crystals (particularly mullite). However, incorporation of a large amount of $P_2O_5$ makes it likely that the glass causes phase separation. Therefore, the content of $P_2O_5$ is preferably 0 to 10%, more preferably 0 to 5%, still more preferably 0 to 3%, yet still more preferably 0 to 2%, even more preferably 0 to 1%, and particularly preferably 0 to 0.1%.

$SnO_2$ acts as a clarifying agent that reduces bubbles in glass. However, if the content of $SnO_2$ is too large, devitrified crystals of $SnO_2$ are likely to be formed in the glass. A preferred upper limit to the content of $SnO_2$ is 1%, more preferably 0.5%, still more preferably 0.4%, and particularly preferably 0.3%, and a preferred lower limit thereto is 0%, more preferably 0.01%, still more preferably 0.03%, and particularly preferably 0.050. The most preferred range of contents is 0.05 to 0.30.

In addition to the above components, other components may be incorporated into the glass substrate. The amount of other components incorporated is, in total, preferably 5% or less, more preferably 3% or less, and particularly preferably 1% or less.

$ZrO_2$ is a component that increases the chemical durability, but a large amount of $ZrO_2$ incorporated makes it likely that $ZrSiO_4$ crystals form. A preferred upper limit to the content of $ZrO_2$ is 1%, more preferably 0.5%, still more preferably 0.3%, yet still more preferably 0.2%, and particularly preferably 0.1%, and, from the perspective of chemical durability, not less than 0.001% $ZrO_2$ is preferably incorporated. The most preferred range of contents is 0.001% to 0.1%. $ZrO_2$ may be incorporated from a raw material or may be incorporated by elution from a refractory.

$TiO_2$ is a component that decreases the high-temperature viscosity to increase the meltability and also a component that increases the chemical durability, but an excessive incorporation of $TiO_2$ makes it likely that the ultraviolet transmittance decreases. The content of $TiO_2$ is preferably 3% or less, more preferably 1% or less, still more preferably 0.5 or less, yet still more preferably 0.1% or less, even more preferably 0.05% or less, even still more preferably 0.03% or less, and particularly preferably 0.01% or less. When an extremely small amount (for example, 0.0001% or more) of $TiO_2$ is incorporated into the glass substrate, the effect of reducing coloration due to ultraviolet rays can be obtained. The most preferred range of contents is 0.0001 to 0.01%.

$As_2O_3$ and $Sb_2O_3$ are components acting as a clarifying agent, but are chemical substances of environmental concern and are therefore preferably used as few as possible. The content of each of $As_2O_3$ and $Sb_2O_3$ is preferably less than 0.3%, more preferably less than 0.1%, still more preferably less than 0.09%, yet still more preferably less than 0.05%, even more preferably less than 0.03%, even still more preferably less than 0.01%, even yet still more preferably less than 0.005%, and particularly preferably less than 0.003%.

Iron is a component that may be mixed as an impurity from a raw material into the glass substrate, but an excessive large content of iron may decrease the ultraviolet transmittance. If the ultraviolet transmittance decreases, problems may occur in a photolithography process for making TFT, a liquid crystal orientation process using ultraviolet rays, and a laser lift-off process during a production process of a plastic OLED. Therefore, a preferred lower limit to the content of iron is, in terms of $Fe_2O_3$, 0.0001%, more preferably 0.0005%, still more preferably 0.001%, and particularly 0.0015%, and a preferred upper limit thereto is, in terms of $Fe_2O_3$, 0.01%, more preferably 0.009%, still more preferably 0.008%, yet still more preferably 0.007%, and particularly 0.006%. The most preferred range of contents is 0.0015% to 0.006%.

$Cr_2O_3$ is a component that may be mixed as an impurity from a raw material into the glass substrate. However, an excessive large content of $Cr_2O_3$ may cause, in doing examination of the inside of the glass substrate for foreign bodies based on scattering of light entering through the glass substrate end surface, the scattered light to have difficulty passing through the glass substrate and thus may cause a trouble with the examination for foreign bodies. Particularly, when the substrate size is 730 mm×920 mm or larger, this trouble is more likely to occur. Furthermore, if the thickness of the glass substrate is small (for example, 0.5 mm or less, 0.4 mm or less, particularly 0.3 mm or less), the amount of light entering through the glass substrate end surface becomes small, in which case the limiting of the content of $Cr_2O_3$ is of great significance. A preferred upper limit to the content of $Cr_2O_3$ is 0.001%, more preferably 0.0008%, still more preferably 0.0006%, yet still more preferably 0.0005%, and particularly preferably 0.0003%, and a preferred lower limit thereto is 0.00001%. The most preferred range of contents is 0.00001 to 0.0003%.

$SO_3$ is a component that may be mixed as an impurity from a raw material into the glass substrate, but an excessive large content of $SO_3$ may form bubbles called reboil during melting or forming to cause defects in the glass. A preferred upper limit to the content of $SO_3$ is 0.005%, more preferably 0.003%, still more preferably 0.002%, and particularly preferably 0.001%, and a preferred lower limit thereto is 0.0001%. The most preferred range of contents is 0.0001% to 0.001%.

Next, a description will be given of a method for producing a glass substrate.

A glass raw material prepared so that a glass substrate having the above composition and characteristics can be obtained is fed into a glass melting apparatus and melted therein at a temperature of about 1500 to about 1650° C. The melting as used in the present invention includes various steps, including clarification and stirring. In the melting process, the glass raw material is preferably electrically melted. The "electrical melting" as used herein is a melting method of passing an electric current through the glass and heating and melting the glass by Joule heat produced by the electric current.

Next, the molten glass is fed into a forming apparatus and formed into a sheet by a downdraw method. The preferred downdraw method to be adopted is the overflow downdraw method. The overflow downdraw method is a method for forming glass into a sheet by overflowing molten glass from both lateral sides of a gutter-shaped refractory having a wedge-shaped cross section and allowing the overflowed molten glass to converge at the bottom end of the gutter-shaped refractory and concurrently drawing it downward. In the overflow downdraw method, the planes of the molten glass that will form the surfaces of a glass substrate do not contact the gutter-shaped refractory and are formed, in a free-surface state, into shape. Therefore, an unpolished glass substrate having a good surface quality can be produced at low cost and the glass can be easily increased in size and easily thinned. The structure and material of the gutter-shaped refractory for use in the overflow downdraw method are not particularly limited so long as they can provide a desired dimension and a desired surface accuracy. Furthermore, the method for applying a force to molten glass during downward drawing of molten glass is also not particularly limited. For example, a method of drawing molten glass by rotating a heat-resistant roll having a sufficiently large width while bringing it into contact with the glass or a method of drawing molten glass while bringing a plurality of pairs of heat-resistant rolls into contact only with the end surface of the glass and its neighborhood may be adopted. Except for the overflow downdraw method, for example, the slot down method can be adopted.

No particular limitation is placed on the width of the sheet of glass, but, in order to obtain a plurality of glass substrates in a width direction of the glass (i.e., a direction perpendicular to the direction of drawing of the sheet) in a splitting process to be described hereinafter, the sheet width is preferably 2 m or more, more preferably 2.2 m or more, still more preferably 2.4 m or more, yet still more preferably 2.6 m or more, even more preferably 2.8 m or more, and particularly preferably 3 m or more. However, if the width of the sheet glass is too large, the size of the forming apparatus becomes excessively large, so that the service life of the forming apparatus tends to be shortened. Therefore, the width of the sheet glass is preferably not more than 4 m, more preferably not more than 3.5 m, and particularly preferably not more than 3.2 m.

Subsequently, the sheet glass is fed into an annealing furnace and cooled therein. The cooling rate is related directly to the degree of thermal contraction of a resulting glass substrate and therefore needs to be strictly managed. Specifically, in order to lower the degree of thermal contraction of the glass substrate, the average cooling rate in a temperature range from (the annealing point plus 150° C.) to (the annealing point minus 200° C.) is preferably not higher than 400° C./min, more preferably not higher than 390° C./min, still more preferably not higher than 380° C./min, yet still more preferably not higher than 370° C./min, even more preferably not higher than 360° C./min, and still even more preferably not higher than 350° C./min. However, if the average cooling rate is too low, the production efficiency tends to decrease. Therefore, the average cooling rate in a temperature range from (the annealing point plus 150° C.) to (the annealing point minus 200° C.) is preferably not lower than 100° C./min, more preferably not lower than 150° C./min, still more preferably not lower than 200° C./min, and particularly preferably not lower than 250° C./min. The adjustment of the cooling rate may be made by adjusting the electric power of heaters disposed in the direction of conveyance of the glass. Specifically, this can be implemented by providing a plurality of individually adjustable heaters along the direction of conveyance of the glass and adjusting the electric power of each heater. Furthermore, in order to reduce in-plane variations in the degree of thermal contraction of the glass substrate, the temperature is preferably controlled so that variations in the cooling rate in the sheet width direction can be reduced. Specifically, this can be implemented by providing a plurality of individually adjustable heaters along the sheet width direction and adjusting the electric power of each heater. Moreover, from the perspective of decreasing the degree of thermal contraction, the annealing furnace is preferably as long as possible and, specifically, the length thereof is preferably not less than 2 m, more preferably not less than 3 m, still more preferably not less than 4 m, yet still more preferably not less than 5 m, even more preferably not less than 6 m, even still more preferably not less than 7 m, even yet still more preferably not less than 8 m, further preferably not less than 9 m, and particularly preferably not less than 10 m. However, when the length of the annealing furnace is increased, the glass melting apparatus and the forming furnace accordingly have to be placed at higher locations, which may impose limitations on the design of the facilities. In addition, the glass hanging down from the forming apparatus becomes excessively heavy, so that the glass becomes difficult to retain. Specifically, the length of the annealing furnace is preferably not more than 30 m, more preferably not more than 25 m, still more preferably not more than 22 m, yet still more preferably not more than 20 m, even more preferably not more than 18 m, even still more preferably not more than 16 m, and particularly preferably not more than 15 m.

The sheet glass formed in the above manner is cut into a predetermined length, thus obtaining a glass substrate (mother glass substrate). Furthermore, when the resulting glass substrate is split in the width direction, a plurality of glass substrates can be obtained. For example, a glass substrate (3 m×1.8 m glass substrate) made by cutting 3 m width sheet glass into 1.8 m length can make two glass substrates of G6 size (1.5 m×1.8 m). Likewise, a glass substrate with 2.6 m×1.1 m can make two glass substrates of G5 size (1.2 m×1.0 m to 1.3 m×1.1 m). Likewise, a glass substrate with 2.19 m×0.92 m can make three glass substrates of G4.5 size (0.73 m×0.92 m). When in the above manner a glass substrate having a large sheet width is formed and then split into a plurality of glass substrates, the production efficiency can be increased. Therefore, even if the average cooling rate is decreased in order to lower the degree of thermal contraction of the glass substrate as described previously, the production efficiency can be maintained. After the glass substrate is cut, it may be subjected to various types of chemical or mechanical processing as necessary.

No particular limitation is placed on the thickness of the glass substrate, but, in order to facilitate the weight reduction of a device, the thickness is preferably not more than 0.5 mm, more preferably not more than 0.4 mm, still more preferably not more than 0.35 mm, and particularly preferably not more than 0.3 mm. However, if the thickness is too small, the glass substrate easily bends. Therefore, the thickness of the glass substrate is preferably not less than 0.001 mm and particularly preferably not less than 0.005 mm. The thickness can be adjusted by the flow rate, the drawing speed, and so on during production of the glass.

Examples 1

Hereinafter, the present invention will be described in detail with reference to examples. The following examples are simply illustrative. The present invention is not at all limited to the following examples.

Table 1 shows working examples (samples A to C and F to H) of the present invention and comparative examples (samples D, E, and I).

The β-OH value is a value calculated as described previously.

The density is a value measured by the well-known Archimedes' method.

The coefficient of thermal expansion is an average coefficient of thermal expansion measured with a dilatometer in a temperature range of 30 to 380° C.

The Young's modulus is a value measured by dynamic elastometry (the resonance method) based on JIS R1602.

The strain point and the annealing point are values measured based on the method described in ASTM C336.

The temperature at a high-temperature viscosity of $10^{4.5}$ dPa·s is a value measured by the platinum ball pulling-up method.

TABLE 1

|  |  | A | B | C | D | E | F | G | H | I |
|---|---|---|---|---|---|---|---|---|---|---|
| Glass Composition [% by mole] | $SiO_2$ |  |  | 67.9 |  |  |  | 67.6 |  |  |
|  | $Al_2O_3$ |  |  | 12.8 |  |  |  | 13.1 |  |  |
|  | $B_2O_3$ |  |  | 3.0 |  |  |  | 3.3 |  |  |
|  | MgO |  |  | 5.8 |  |  |  | 6.2 |  |  |
|  | CaO |  |  | 6.5 |  |  |  | 6.5 |  |  |
|  | SrO |  |  | 1.4 |  |  |  | 1.6 |  |  |
|  | BaO |  |  | 2.6 |  |  |  | 1.7 |  |  |
|  | $Na_2O$ |  |  | 0.011 |  |  |  | 0.010 |  |  |
|  | $K_2O$ |  |  | 0.002 |  |  |  | 0.002 |  |  |
|  | $SnO_2$ |  |  | 0.089 |  |  |  | 0.098 |  |  |
|  | $ZrO_2$ |  |  | 0.005 |  |  |  | 0.011 |  |  |
|  | $TiO_2$ |  |  | 0.009 |  |  |  | 0.003 |  |  |
|  | $Fe_2O_3$ |  |  | 0.004 |  |  |  | 0.004 |  |  |
|  | $Cr_2O_3$ |  |  | 0.002 |  |  |  | 0.001 |  |  |
| β-OH [/mm] |  |  |  | 0.10 |  |  |  | 0.13 |  |  |
| Density[g/cm³] |  |  |  | 2.58 |  |  |  | 2.55 |  |  |
| Coefficient of Thermal Expansion[° C.] |  |  |  | 38 |  |  |  | 37 |  |  |
| Young's Modulus[GPa] |  |  |  | 82 |  |  |  | 83 |  |  |
| Strain Point[° C.] |  |  |  | 724 |  |  |  | 725 |  |  |
| Annealing Point[° C.] |  |  |  | 775 |  |  |  | 782 |  |  |
| Temperature at $10^{4.5}$ dPa · s[° C.] |  |  |  | 1260 |  |  |  | 1255 |  |  |
| Liquidus Viscosity(log η at TL)(dPa · s) |  |  |  | 5.3 |  |  |  | 5.3 |  |  |
| Cooling Rate at (Annealing Point + 150° C.) to (Annealing Point−200° C.)[° C./min] |  | 150 | 270 | 400 | 550 | 700 | 210 | 280 | 350 | 460 |
| Degree of Thermal Contraction[ppm] |  | 11 | 13 | 15 | 16 | 18 | 11 | 12 | 13 | 16 |

First, to give the composition shown in Table 1, silica sand, aluminum oxide, boric oxide, calcium carbonate, strontium nitrate, barium nitrate, stannic oxide, strontium chloride, barium chloride were mixed and formulated.

Next, the glass raw material was fed into an electric melting furnace not combined with burner combustion and melted therein and, subsequently, molten glass was clarified and homogenized in a clarifier tank and adjusted, in a regulating tank, to a viscosity suitable for forming.

Subsequently, the molten glass was fed into an overflow downdraw forming apparatus, formed therein into a sheet, then gradually cooled to reach the cooling rate described in Table 1, and cut to make a glass substrate having a thickness of 0.5 mm, a width of 3 m, and a length of 1.8 m. Thereafter, the glass substrate was split into two 0.5 mm thick glass substrates of G6 size (1.5 m×1.8 m). The molten glass after exiting the melting furnace was fed into the forming apparatus while being in contact only with platinum or platinum alloy. The resultant samples were evaluated in terms of β-OH value, density, coefficient of thermal expansion, Young's modulus, strain point, annealing point, temperature at $10^{4.5}$ dPa·s, liquidus viscosity, and degree of thermal contraction.

The liquidus viscosity is a value obtained by measuring the viscosity of the glass at a liquidus temperature by the platinum ball pulling-up method.

The degree of thermal contraction was measured by the method described previously.

Since the samples A to C and F to H exhibited strain points lower than 750° C. and cooling rates as slow as 400° C./min or lower, their degrees of thermal contraction were as low as 15 ppm or less. Furthermore, since the strain points of the samples A to C and F to H were lower than 750° C., their burden on the forming facilities can be considered to be low. In contrast, the samples D, E, and I exhibited strain points lower than 750° C., but exhibited cooling rates as fast as 460° C./min or higher, so that their degrees of thermal contraction were as high as 16 ppm or more.

Examples 2

Table 2 shows working examples (samples 1 to 8) of the present invention and a comparative example (sample 9).

TABLE 2

|  |  | 1 | 2 | 3 | 4 | 5 | 6 | 7 | 8 | 9 |
|---|---|---|---|---|---|---|---|---|---|---|
| Glass Composition [% by mole] | $SiO_2$ | 67.4 | 67.5 | 67.3 | 65.9 | 65.2 | 66.8 | 66.6 | 67.1 | 66.3 |
|  | $Al_2O_3$ | 13.0 | 13.2 | 12.5 | 14.0 | 14.5 | 13.9 | 14.0 | 12.2 | 12.7 |
|  | $B_2O_3$ | 4.0 | 3.3 | 3.0 | 2.9 | 2.4 | 3.1 | 3.2 | 2.9 | 6.3 |
|  | MgO | 6.0 | 6.1 | 6.1 | 5.0 | 4.5 | 5.9 | 6.1 | 6.9 | 4.2 |
|  | CaO | 6.5 | 6.5 | 6.5 | 6.1 | 5.9 | 7.2 | 6.1 | 6.3 | 7.6 |
|  | SrO | 1.5 | 1.6 | 2.1 | 2.9 | 3.6 | 1.0 | 0.9 | 1.3 | 0.3 |
|  | BaO | 1.5 | 1.7 | 2.4 | 3.1 | 3.9 | 2.0 | 3.0 | 3.2 | 2.5 |
|  | $Na_2O$ | 0.010 | 0.010 | 0.011 | 0.012 | 0.012 | 0.011 | 0.010 | 0.011 | 0.013 |
|  | $K_2O$ | 0.002 | 0.002 | 0.002 | 0.002 | 0.002 | 0.002 | 0.003 | 0.002 | 0.003 |
|  | $SnO_2$ | 0.090 | 0.090 | 0.090 | 0.090 | 0.090 | 0.090 | 0.090 | 0.090 | 0.100 |
|  | $ZrO_2$ | 0.005 | 0.005 | 0.003 | 0.004 | 0.004 | 0.005 | 0.004 | 0.003 | 0.025 |
|  | $TiO_2$ | 0.009 | 0.009 | 0.003 | 0.004 | 0.007 | 0.006 | 0.005 | 0.004 | 0.003 |
|  | $Fe_2O_3$ | 0.004 | 0.004 | 0.004 | 0.005 | 0.004 | 0.004 | 0.004 | 0.004 | 0.007 |
|  | $Cr_2O_3$ | 0.002 | 0.002 | 0.001 | 0.001 | 0.001 | 0.002 | 0.001 | 0.002 | 0.001 |
| β-OH [/mm] |  | 0.10 | 0.10 | 0.09 | 0.09 | 0.09 | 0.10 | 0.09 | 0.09 | 0.35 |
| Density[g/cm$^3$] |  | 2.53 | 2.55 | 2.57 | 2.63 | 2.68 | 2.56 | 2.59 | 2.60 | 2.52 |
| Coefficient of Thermal Expansion[° C.] |  | 37 | 36 | 38 | 40 | 42 | 37 | 37 | 39 | 37 |
| Young's Modulus[GPa] |  | 82 | 83 | 82 | 82 | 83 | 84 | 83 | 82 | 78 |
| Strain Point[° C.] |  | 720 | 725 | 722 | 725 | 728 | 730 | 733 | 718 | 689 |
| Annealing Point[° C.] |  | 775 | 780 | 780 | 780 | 780 | 785 | 785 | 775 | 745 |
| Temperature at $10^{4.5}$ dPa · s[° C.] |  | 1250 | 1255 | 1255 | 1250 | 1250 | 1252 | 1258 | 1250 | 1226 |
| Liquidus Viscosity(log η at TL)[dPa · s] |  | 5.3 | 5.2 | 5.2 | 5.1 | 5.0 | 4.9 | 5.0 | 5.4 | 5.6 |
| Cooling Rate at (Annealing Point + 150° C.) to (Annealing Point − 200° C.)[° C./min] |  |  |  |  |  | 250 |  |  |  |  |
| Degree of Thermal Contraction[ppm] |  | 14 | 12 | 13 | 13 | 13 | 12 | 12 | 14 | 20 |

The samples 1 to 8 described in Table 2 were made and evaluated in the same manners as in Example 1.

Since the samples 1 to 8 exhibited strain points lower than 750° C. and slow cooling rates lower than 400° C./min, their degrees of thermal contraction were as low as 14 ppm or less. Furthermore, since the strain points of the samples 1 to 8 were lower than 750° C., their burden on the forming facilities can be considered to be low. In contrast, the sample 9 exhibited a low strain point lower than 690° C., so that its degree of thermal contraction was as high as 20 ppm.

The invention claimed is:

1. A method for producing a glass substrate, comprising: melting and forming a glass raw material to produce a glass substrate having a strain point of 710 to 750° C., wherein an average cooling rate in a temperature range from (an annealing point plus 150° C.) to (the annealing point minus 200° C. in a cooling process during the forming is adjusted to 200 to 400° C./min to obtain the glass substrate having a degree of thermal contraction of 15 ppm or less when subjected to a heat treatment at 500° C. for an hour and β-OH value of 0.30/mm or less; and the glass substrate containing, as a glass composition in terms of % by mole, 60 to 75% $SiO_2$, 10 to 15% $Al_2O_3$, 0 to 5% $B_2O_3$, 0 to 0.1% $Li_2O$, 0 to 0.1% $Na_2O$, 0 to 1% $K_2O$, 0 to 8% MgO, 0 to 10% CaO, 0 to 10% SrO, 0.1 to 10% BaO, 0 to 10% ZnO, 0 to 10% $P_2O_5$, and 0 to 1% $SnO_2$.

2. The method for producing a glass substrate according to claim 1, wherein the forming is performed by an overflow downdraw method.

3. The method for producing a glass substrate according to claim 1, obtaining the glass substrate having a width of 3 m or more.

4. The method for producing a glass substrate according to claim 1, wherein after the forming into the glass substrate, the glass substrate is split into two or more glass substrates of G6 size (1.5 m×1.8 m).

* * * * *